United States Patent [19]

Alford

[11] 4,222,933

[45] Sep. 16, 1980

[54] TREATMENT OF ROSIN

[75] Inventor: John A. Alford, Hanahan, S.C.

[73] Assignee: Westvaco Corporation, New York, N.Y.

[21] Appl. No.: 61,906

[22] Filed: Jul. 30, 1979

[51] Int. Cl.² ............................................. C09F 1/04
[52] U.S. Cl. ........................................ 260/107; 260/97; 260/108
[58] Field of Search .................. 260/107, 108, 97, 109

[56] References Cited

U.S. PATENT DOCUMENTS

| | | | |
|---|---|---|---|
| 1,782,401 | 11/1930 | Borglin | 260/106 |
| 2,394,416 | 2/1946 | Zeiss | 260/106 |
| 2,396,671 | 3/1946 | Auer | 260/97 |
| 2,441,063 | 5/1948 | Gilmann | 260/97.5 |
| 2,448,621 | 9/1948 | Rice | 260/97.5 |
| 2,492,146 | 12/1949 | Hampton | 260/108 |
| 2,495,852 | 1/1950 | Lien et al. | 260/108 |
| 2,567,250 | 9/1951 | St. Clair et al. | 260/106 |
| 2,617,792 | 11/1952 | Floyd | 260/106 |
| 2,763,638 | 9/1956 | Nevin | 260/97.5 |
| 3,786,037 | 1/1974 | Waldemar et al. | 260/106 |
| 3,912,709 | 10/1975 | Gould | 260/100 |
| 3,929,703 | 12/1975 | Weymann et al. | 260/27 BB |

*Primary Examiner*—H. S. Cockeram
*Attorney, Agent, or Firm*—Ernest B. Lipscomb, III; Terry B. McDaniel

[57] ABSTRACT

A process is disclosed for treating rosin with a zinc catalyst and a boric acid catalyst to improve the color and color stability of distilled products. The zinc catalyst is employed in an amount of from 0.01% to about 2.0% by weight of rosin and the boric acid in an amount from 0.001% to about 1.0% by weight of rosin. The rosin is treated with the zinc and boric acid catalyst at a temperature between 180° C. and 250° C.

8 Claims, No Drawings

TREATMENT OF ROSIN

BACKGROUND OF THE INVENTION (1) Field of the Invention

This invention relates to a process for treating rosin. More particularly, this invention relates to a process for treating tall oil rosin with a zinc catalyst and a boric acid catalyst to improve color and color stability of the tall oil rosin acids.

Tall oil is a natural mixture of rosin acids and fatty acids, together with unsaponifiable materials, which is obtained by acidifying the black liquor skimmings of the sulfate process of wood pulp manufacture, using resinous woods such as pine. The composition of tall oil varies somewhat depending upon such factors as the species of the wood which was pulped. Crude tall oil acids generally contain from about 18% to 60% fatty acids, 28% to 66% rosin acids and 3% to 24% other constituents, notably unsaponifiable materials. Crude tall oil may be distilled and fractioned to separate the fatty acid and rosin acid fractions.

Tall oil rosin consists of a major portion of resin acids which are monocarboxylic acids of alkyl hydrophenanthrene. The major resin acids found in tall oil rosin are abietic acid, dehydroabietic acid, neoabietic, palustric, pimaric acid, and isopimaric acid. Tall oil rosin usually contains a small amount of fatty acids as well as some unsaponifiable material.

(2) The Prior Art

In the processing of rosin at elevated temperatures, care must be taken to prevent the unwanted decarboxylation reaction, since this causes a decrease in both acid number and softening point and increases color. When rosin is heated to about 300° C. (572° F.) or higher, decarboxylation occurs with the formation of nearly neutral material known as rosin oil. Decarboxylation also takes place readily in the presence of catalysts, such as zinc, sulfonic acids and siliceous earths at temperatures of 120° C.–280° C. (248° F.–536° F.). The rate of decarboxylation is greatly increased by the use of these and other acidic catalysts. The color of rosin and its tendency to decarboxylate at high temperatures have hindered the desirability of their use in many applications where color is important. To attest this fact, the prior art is replete with methods for making rosin lighter in color with changing the character of the rosin. Treatment of rosin with zinc to make resinates is illustrated by U.S. Pat. No. 2,396,671 to Aver, U.S. Pat. No. 2,394,416 to Ziess, U.S. Pat. No. 3,912,709 to Gould, and U.S. Pat. No. 3,929,703 to Weyman. Zinc has also been used to improve color of fatty acids from which all or a major proportion of the rosin acids have been removed as shown by Nevin in U.S. Pat. No. 2,763,638.

Boric acid and borax are also known catalysts for treating fatty acids. For example, in U.S. Pat. No. 2,862,943 to Wheeler small amounts of boric acid were used to treat tall oil fatty acids to improve color; but if the fatty acids contained more than 1% rosin, decarboxylation becomes a problem. U.S. Pat. No. 2,448,621 to Rice and U.S. Pat. No. 2,441,063 to Gilmann teach treating fatty acid and rosin materials with boric acid or borax.

It is, therefore, the general object of this invention to provide a catalyst system for treating rosin to upgrade and stabilize its color.

Another object of this invention is to provide a process for upgrading the color and maintaining the color stability of tall oil rosin and at the same time improve acid number and softening point.

It is a further object of this invention to provide a process which accomplishes the above objects using in combination a zinc catalyst and boric acid catalyst.

Other objects, features and advantages of this invention will be evident from the following detailed description.

SUMMARY OF THE INVENTION

It has been found that the treatment of rosin with small amounts of boric acid and zinc leads to a significant improvement in the initial color and color stability of the distilled products. The zinc is used in an amount from about 0.01% to 2.0% by weight rosin and the boric acid in an amount from about 0.001% to 1.0% by weight rosin. The rosin may be treated with both zinc and boric acid catalysts at the same time or consecutively in either order. During catalyst treatment, the rosin is at a temperature between 180° C. to 250° C. The thus treated rosin, in addition to having improved color and color stability, has higher acid number and higher softening point.

DETAILED DESCRIPTION OF THE INVENTION

In carrying out the process of this invention, the rosin, preferably tall oil rosin, is treated with both zinc catalyst and boric acid catalyst at the same time or consecutively in either order. The catalysts are added to the tall oil rosin and heated to the desired temperature or added while the rosin is hot.

The amount of boric acid catalyst added is from 0.001% to 1.0% by weight of rosin, preferably from about 0.1% to 0.5% by weight. Larger quantities than 1% may be used but in general are unnecessary and, therefore, serve no useful purpose over the smaller quantities. A variety of boric acid compounds may be used including ortho boric acid, tetraboric acid, boric oxide, and salts of the above acids such as borax. In view of the acidity of the rosin acids, presumably these materials are present as boric acids during treatment. The quantity of the boric acid depends upon the nature of the feed stock. The color of the feed stock is not necessarily indicative of the quantity of boric acid which may be necessary for its treatment. In some instances very highly colored feed stocks may be purified readily to a low color by small quantities of the boric acid. In other instances feed stocks which are not too dark may require substantial quantities of boric acid for the purification treatment. It is best to determine the optimum quantity experimentally with each quantity of feed stock.

While as little zinc as 0.01% by weight of the tall oil rosin shows some improvement in the properties, it is preferable to use from about 0.05% to about 0.5% by weight of the zinc. In general, however, amounts ranging up to about 1% to 2% may be used effectively, with larger amounts up to 5%, for example, presenting no material advantage. The zinc is preferably added in a finely divided form such as zinc dust or zinc powder. However, zinc in any other desirable form may also be used as, for example, mossy zinc, zinc turnings or granular zinc.

While surprising and unexpected results are achieved with varying ratios of boric acid to zinc within the ranges described herein, the most surprising and unexpected discovery of the invention is the improved initial color and color stability as well as higher acid number and higher softening point characteristics of the rosin when the rosin is treated with equal amounts of boric acid and zinc.

The temperature used for treatment of the tall oil rosin acid mixture is preferably from about 180° C. to about 250° C., but temperatures ranging from 200° C.–235° C. are effective within the broader aspects of the present inventive concept. The pressure maintained during the treatment of the tall oil rosin acid mixture is preferably normal atmospheric pressure, but it is to be appreciated that sub-atmospheric or super-atmospheric pressures may be used with corresponding changes in temperatures.

The time required for catalyst treatment will depend to a large extent upon the final color desired. For example, significant color improvement is apparent as soon as the zinc catalyst makes contact with the tall oil rosin acids. Other factors affecting the treatment time include temperature, amount of color bodies in the starting fatty acids and the degree of agitation. Generally, 5 minutes to 20 minutes are needed to obtain a commercially desirable color improvement.

It is not necessary that the process be carried out in an inert atmosphere although it is desirable since contact with air tends to cause darkening of the rosin. It is desirable to conduct the treatment in an inert atmosphere to avoid this darkening effect, and also as an aid for the removal of volatile impurities. Suitable inert gases which may be used include nitrogen, hydrogen, dry steam, carbon dioxide and the like.

If desired, solvents may be used to reduce the viscosity of the rosin, especially at lower temperatures, and to maintain a temperature fixed by the boiling point of the mixture. This is advantageous in some cases since improved and more intimate contact of the rosin acid/solvent mixture with the zinc metal particles can thus be attained where lower temperatures may be preferred. Suitable solvents include non-aqueous solvents such as mono-cyclic aromatic hydrocarbons, i.e., benzene, toluene, xylene, etc., petroleum hydrocarbons, terpenes, and the like.

Distallation of the tall oil rosin acids treated according to the process of the present invention is the simple distillations normally carried out in the industry. Temperatures and pressures are, of course, interdependent and vary within wide related ranges. In the present case, however, it has been found that temperatures of from about 200° C. to about 240° C. and pressures of from about 3 to about 15 mm. are preferred, although lower and higher values are effective, provided the conditions are such that the tall oil fatty acids distillable away from the undesirable natural antioxidants and interfering anti-drying bodies. The distillations may also be carried out in the presence of steam or an inert gas such as carbon dioxide, nitrogen, etc., at relatively higher pressures of from about 30 to about 70 mm. Hg. or more.

With regard to the color-forming materials which are present in the tall oil rosin acids and which are removed by the process of the present invention, it is presumably believed that they comprise phenolic bodies and other antioxidants and that they are normally present in amounts of from about 0.01% to about 1.0% by weight. Their exact chemical structure and nature, however, have not been established; but it has been determined that, once they are removed by the process herein described the thus treated tall oil rosin acquires excellent color and possesses improved acid number and higher softening point.

The practice of this invention may clearly be seen from the following example in which the proportions are by weight unless otherwise indicated.

EXAMPLE

The tall oil rosin acid feed used in this example to illustrate the practice of this invention refers to a singularly distilled tall oil rosin acid comprising, approximately 95% rosin acids, 2.0% fatty acids and 1.0% unsaponifiables and other materials. Typically, the Acid Number was 163.4, the softening point 71° C. and the initial Gardner Color 8+.

This example illustrates the effects on rosin color using the process of this invention. Portions of the tall oil rosin feed were treated with 0.01% to 1.0% boric acid and zinc at 0.025% to 0.1% and heating at various temperatures from 175° C. to 225° C. The thus treated rosins were distilled at 205° C.–215° C., and 10 mm. Hg. pressure. A 95% distillate fraction was obtained. After measuring initial color, the distillate portions were placed in a forced-air oven at 105° C. and the color stability measured after 2 hours. The results using the various parameters are shown in the table below:

| TALL OIL ROSIN TREATMENT - INITIAL COLOR 8+ | | | | | | | |
|---|---|---|---|---|---|---|---|
| Boric Acid (Wt. %) | Zinc (Wt. %) | Temp. (°C.) | Time (Min.) | Distilled Product Color (Gardner) | Product Color Stability 2 hrs. at 105° C. (Gardner) | Acid Number | Softening Point (Ring & Ball), °C. |
| NO CATALYST | | 200 | 15 | 7 | 10 | 163.4 | 71 |
| 0.01 | 0 | 200 | 15 | 6+ | — | — | — |
| 0.05 | 0.05 | 200 | 15 | 4.8 | 5.5 | 195 | 79 |
| 0.01 | 0.1 | 200 | 15 | 6+ | — | — | — |
| 0.1 | 0.1 | 200 | 15 | 5 | 7 | 179 | 79 |
| 0.25 | 0.25 | 200 | 15 | 4.8 | 6.1 | 180 | 76 |
| 0 | 0.01 | 200 | 15 | 8— | — | — | — |
| 0.5 | 0.5 | 200 | 15 | 5.7 | 6.7 | 188 | 76 |

The data clearly shows the synergistic effect of treating tall oil rosin with zinc and boric acid. The results show both better initial color and color stability as well as higher acid number and higher softening point.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for treating rosin which comprises:
   (a) treating said rosin with from 0.001% to 1.0% boric acid and with zinc in an amount from 0.01% to about 2.0% by weight of said rosin at a temperature from about 180° C. to 250° C., and
   (b) distilling the thus treated rosin to obtain rosin acids having improved color and color stability.

2. The process according to claim 1 wherein said rosin is tall oil rosin.

3. The process according to claim 2 wherein said boric acid is present in an amount from 0.1% to 0.5% and said zinc is present in an amount from 0.05% to 0.5%.

4. The process according to claim 2 wherein the time for treating with zinc and boric acid together is from 5 minutes to 20 minutes.

5. The process according to claim 2 wherein the boric acid treatment and zinc treatment are carried out co-currently.

6. The process according to claim 2 wherein both the boric acid and zinc treatments are at a temperature of from about 200° C. to 235° C.

7. The process according to claims 1, 2 or 3 wherein the boric acid and zinc are present in equal amounts.

8. The process according to claim 1 wherein the process is carried out in an inert atmosphere of a gas selected from the group of nitrogen, hydrogen, dry steam and carbon dioxide.

* * * * *

UNITED STATES PATENT AND TRADEMARK OFFICE
CERTIFICATE OF CORRECTION

PATENT NO. : 4,222,933
DATED : September 16, 1980
INVENTOR(S) : John A. Alford

It is certified that error appears in the above—identified patent and that said Letters Patent are hereby corrected as shown below:

In column 3, line 59, "Distallation" should read --Distillation--.

In column 3, line 68, after "acids", the word --are-- should be inserted.

Signed and Sealed this

Twenty-fourth Day of February 1981

[SEAL]

Attest:

RENE D. TEGTMEYER

Attesting Officer    Acting Commissioner of Patents and Trademarks